United States Patent [19]

Blythe et al.

[11] Patent Number: 5,011,876

[45] Date of Patent: Apr. 30, 1991

[54] PNEUMATIC TIRES

[75] Inventors: Robert J. Blythe; Paul G. Scally, both of Birmingham, England

[73] Assignee: Sumitomo Rubber Industries Limited, Hyogo, Japan

[21] Appl. No.: 305,947

[22] Filed: Feb. 2, 1989

[51] Int. Cl.$^5$ ................................................ C08K 5/09
[52] U.S. Cl. ...................................... 524/77; 524/322; 152/525; 152/526
[58] Field of Search ................ 524/322, 77; 152/525, 152/526

[56] References Cited

U.S. PATENT DOCUMENTS 2,140,527  12/1938  Haynes et al. .
2,340,699  2/1944  Sarbach .

FOREIGN PATENT DOCUMENTS 0048678  3/1982  European Pat. Off. .
199738   12/1984  Japan .................... 524/322
10092  of 1844  United Kingdom .
13170  of 1850  United Kingdom .

OTHER PUBLICATIONS

Hofman, W., Rubber Technology Handbook, p. 317.
Chemical Abstracts, vol. 105, part 22, 1st Dec. 1986, p. 79, abstract No. 192672b, Columbus, Ohio, US; & JP-A-61 130 357 (Harima Chemicals, Inc.) 18-06-1986.
Chemical Abstracts, vol. 82, part 20, 19th May 1975, p. 54, abstract No. 125320r, Columbus, Ohio, US; B. B. Khanna et al.: "Lac and Modified Lacs As Compounding Ingredients for Natural Rubber. I. Lac and Ethylene Glycol Modified Lac in Gumstock", & Res. Ind. 1974, 19(3), 103-106.

*Primary Examiner*—Joseph L. Schofer
*Assistant Examiner*—Tom Weber
*Attorney, Agent, or Firm*—Fay, Sharpe, Beall, Fagan, Minnich & McKee

[57] ABSTRACT

Pneumatic tires having an improved steering response have a tread portion which comprises an elastomeric composition containing a long chain hydroxy fatty acid or a derivative thereof, or an inter-condensed or intra-condensed form thereof. The hydroxy fatty acid can be a saturated monocarboxylic acid having:

(a) 9 to 25 (for example 13 to 17 and especially 15, 16, or 17) carbon atoms as well as the carbon atom of the carboxylic acid group; and
(b) 1 to 6 (for example 2, 3 or 4) hydroxy groups.

Suitable compounds are di- and tri-hydroxy palmitic and stearic acids. The invention is concerned particularly with the use of shellac as the hydroxy fatty acid compound.

15 Claims, 1 Drawing Sheet

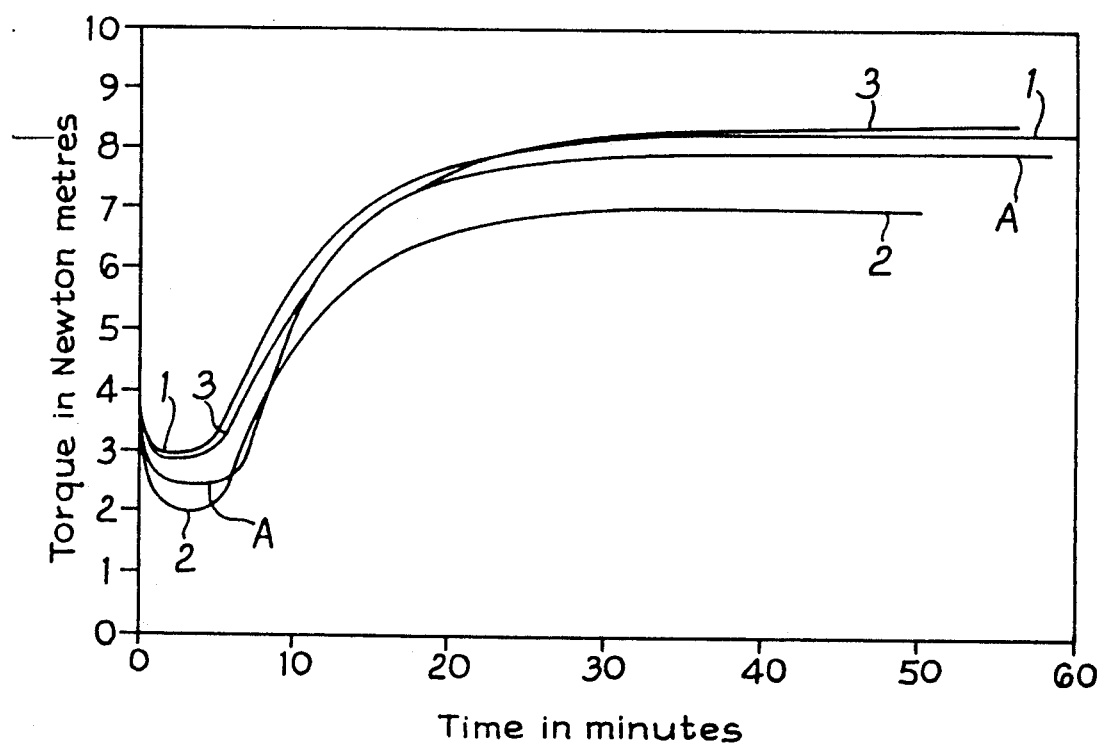

PNEUMATIC TIRES

This invention relates to pneumatic tyres having improved steering response. In a preferred form the invention relates to a means of improving steering response without substantial reduction in frictional grip on wet road surfaces, referred to herein as "wet grip".

Steering response can be defined as the rate of deviation from the "straight ahead" vehicle position during driving by the application of a small steering input (about 15° of steering wheel revolution or about 0.5° slip angle). It is a very important factor in motor racing. Attempts made in the past to increase steering response (which is closely related to a tyre's cornering stiffness) have been by increasing the stiffness of the tyre compound in general and the tread in particular. However, it has been found that increasing the compound stiffness results in a corresponding reduction in the wet grip of the resulting tyres for they then have a lower energy absorption potential (loss compliance).

It has now surprisingly been found that by the inclusion of certain additives (referred to herein as "steering response substances") the steering response of tyres can be increased substantially without any substantial detrimental affect on wet grip.

Accordingly, in a first aspect the present invention provides a pneumatic tyre whose tread portion comprises an elastomeric composition, said composition containing as a steering response substance a long chain hydroxy fatty acid or a derivative thereof, or an inter-condensed or intra-condensed form thereof.

The invention is of particular importance as applied to tyres used in motor sport.

The term "hydroxy fatty acid" as used herein refers to an aliphatic carboxylic acid having at least eight carbon atoms in the molecule, that is including the carbon atom of the carboxylic acid group or groups, the acid having at least 1 (for example 1, 2 or 3) substituent hydroxyl groups.

Thus, for example, where the hydroxy fatty acid is a saturated monocarboxylic acid it can be one having:

(a) 9 to 25 (for example 13 to 17 and especially 15, 16 or 17) carbon atoms as well as the carbon atom of the carboxylic acid group; and (b) 1 to 6 (for example 2, 3 or 4) hydroxy groups.

In a preferred aspect of the invention the hydroxy fatty acid is one having the general formula:

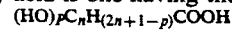

$(HO)_p C_n H_{(2n+1-p)} COOH$ where n is an integer in the range from 9 to 25, for example 13 to 17 and especially 15, 16 or 17; and p is an integer in the range from 1 to 6 for example 2, 3 or 4.

In a further preferred aspect of the invention the hydroxy fatty acid is one having the general formula:

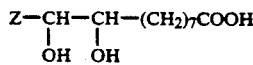

$$Z-\underset{OH}{\underset{|}{CH}}-\underset{OH}{\underset{|}{CH}}-(CH_2)_7 COOH$$

where Z is a hydrocarbyl or hydroxy-substituted hydrocarbyl residue.

The hydroxy acid can be in the form of a functional derivative of the carboxylic acid group or groups of the acid.

Where, for example, n is 15 the acid is a palmitic acid having 16 carbon atoms in the molecule; and where n is 17 the acid is a stearic acid having 18 carbon atoms in the molecule. Examples of hydroxypalmitic acids are:
9,10,16-trihydroxypalmitic acid, mp102° C.
16-hydroxypalmitic acid, mp 95° C.

Examples of hydroxy stearic acids are:
2,3-dihydroxystearic acid, mp 107 and 126° C.
9,10-dihydroxystearic acid, mp 95° C. 2-hydroxystearic acid, mp 93° C. 3-hydroxystearic acid, mp 90° C. 10-hydroxystearic acid, mp 84° C. 11-hydroxystearic acid, mp 82° C. 12-hydroxystearic acid, mp 82° C.

Where the long chain fatty acid is in the form of a derivative the latter can be, for example, an ester, ether, salt or other derivative which is compatible with its use as a steering response substance.

Some of the hydroxy fatty acids used in this invention contain chiral centres. Such compounds can be used in the form of racemic mixtures or in the form of individual isomers. 2,3-dihydroxystearic acid, for example, exists in the form of two isomers having melting points, respectively, of 107° C. and 126° C.

It will be seen that all of the compounds listed above are solids at room temperature (18° C.) and have melting points below 150° C., the melting points lying in the range 50° C. to 130° C., most in the range 80° C. to 110° C.

In a second aspect the invention provides an unvulcanised, vulcanisable composition suitable for use in production of a pneumatic tyre of the first aspect of the invention, said composition comprising a major proportion of an elastomer, compounding ingredients therefor and a minor porportion of a long chain fatty acid or a derivative thereof, or an inter-condensed or intra-condensed form thereof.

According to a third aspect of the invention the steering response substance is shellac.

Shellac, currently obtained as a purified product of the hardened resinous secretion of an insect that is parasitic on certain trees and bushes in India, Burma and Thailand, is a hard, tough, resin. It is believed to be composed of one or more aliphatic polyhydroxy acids which may be in the form of lactones, lactides and/or intermolecular esters. It softens over a range between about 75° C. and 120° C. These lactones and lactides are, respectively, examples of intra-and inter-condensed forms of hydroxy fatty acids.

Shellac exists in several forms characteristics of which are given in the "Concise Encyclopaedia of Chemical Technology" (Kirk Othmer) at pages 1052 and 1053. The nature, properties and chemical constitution of various shellacs are discussed in the following papers:

1. Treatise on Coatings, Vol. 1 Film-forming Compositions, Part III, Marcel Dekker, Inc., New York (1968), P 441ff.

2. Encyclopaedia of Polymer Science and Technology, Vol. 12, Interscience, New York (1970), p.419ff.

Those disclosures are included herein by reference. The form of shellac used in the Examples described below is a form known as "lemon shellac" which is believed to comprise about 96% by weight of 9, 10, 16-trihydroxy palmitic acid. Lemon shellac has a softening range of 80-110 ° C. In producing the tyres of the present invention the shellac (whether of the "lemon" type or other type) is used in any convenient proportion in the elastomer composition such that it will, on the one hand, provide a useful increase in steering response of pneumatic tyres whose tread portion comprises the elastomer composition after vulcanisation and, on the other hand, is not sufficiently high as to derogate from the other desirable properties of the composition. Suitable amounts, for example, lie in the range from 2 to 10 (for instance 3 to 8) parts per 100 parts by weight of the elastomer. Where the elastomer composition is one containing as extending oil, it has been found in general that a suitable modified composition can be obtained by reducing the amount of extending oil in accordance with the amount of shellac included in the composition. Thus, as indicated in the Examples which follow, an elastomer composition of the SBR 1712 type containing ten parts of hydrocarbon extending oil for every 100 parts by weight of the elastomer can have its steering response characteristic greatly improved by the incorporation of five parts by weight of shellac and reducing the extending oil content to five parts by weight.

The shellac or other hydroxy fatty acid (or derivative thereof) can be incorporated in the elastomer composition in any convenient way; however, in general it is incorporated in the composition concurrently with incorporation of the vulcanisation agents and in like manner. The shellac or other hydroxy fatty acid can be in the form of a powder or any other convenient physical form. The melting point (or softening range) of the steering response substance is preferably such that it is in molten (or softened) form under the conditions used for its incorporation in the elastomer composition.

The invention is illustrated by the following Examples. Abbreviations used in the Examples have the following meanings:

SBR 1712—an oil-extended styrene-butadiene copolymer
N 375 black—a carbon black
Enerflex 94—an aromatic extending oil sold by B.P. Oil Company
6PPD—an antidegradant
TMQ—an antidegradant The stearic acid referred to in the Examples was a blend of fatty acids sold for use in the rubber industry and containing fatty acids having 9 to 21,for example 9 to 17, carbon atoms in the hydrocarbon chain.

Examples 1 and 3 and Example 2 illustrate respectively the use as a steering response substance of shellac and of 9,10- dihydroxystearic acid, compared with a control containing neither of them. All "parts" referred to are by weight unless the contrary is stated.

With reference to the control composition the ingredients were blended together in an internal mixer and the resulting rubber composition was moulded into test pieces, the cure being under the conditions referred to below.

The rubber composition of Example 1 has the same constitution as that of the control except that it contains 5 parts of shellac and the amount of extending oil (Enerflex 94) is 5 parts less than that in the control, and it contains no stearic acid.

The rubber composition of Example 2 has the same constitution as that of the control except that it contains 5 parts of 9,10-dihydroxystearic acid and the amount of extending oil (Enerflex 94) is 5 parts less than that in the control.

The rubber composition of Example 3 has the same constitution as that of Example 1 except that it, like the control, contains 1.00 part of stearic acid.

TABLE I

| Ingredient | A Control | Example No. 1 | 2 | 3 |
|---|---|---|---|---|
| SBR 1712 | 100.00 | 100.00 | 100.00 | 100.00 |
| Zinc Oxide | 2.50 | 2.50 | 2.50 | 2.50 |
| Stearic acid | 1.00 | 0.00 | 1.00 | 1.00 |
| Shellac | 0.00 | 5.00 | 0.00 | 5.00 |
| 9,10-dihydroxy stearic acid | 0.00 | 0.00 | 5.00 | 0.00 |
| N375black | 85.00 | 85.00 | 85.00 | 85.00 |
| Enerflex 94 | 10.00 | 5.00 | 5.00 | 5.00 |
| 6PPD | 1.00 | 1.00 | 1.00 | 1.00 |
| TMQ | 0.50 | 0.50 | 0.50 | 0.50 |
| Paraffin wax | 1.00 | 1.00 | 1.00 | 1.00 |
| SUlphur 110 Mesh | 1.20 | 1.20 | 1.20 | 1.20 |
| CBS | 1.20 | 1.20 | 1.20 | 1.20 |
| Total | 203.40 | 202.40 | 203.40 | 203.40 |
| SG | 1.22 | 1.23 | 1.22 | 1.22 |

EXAMPLES 4 to 6

Part of the four rubber compositions of the control and of Examples 1 to 3 was moulded into test samples and subjected to vulcanisation conditions comprising 15 minutes while the temperature was raised to 165° C. followed by 20 minutes at that temperature. The resulting vulcanised test samples were tested using the dynamic response apparatus described in the paper by J.E. Smith and E.C. Sumner, published in "Proceedings of The International Rubber Conference 1972". The test conditions and the values obtained for complex modulus, loss factor and loss modulus are shown in Table 2 below.

A second part of each of the four rubber compositions of Table 1 was tested to assess its wet grip on a road surface. Each of those compositions was used as the tread compound of model tyres of size 2.25-8 inches (57-203mm). The tyres were moulded under the following vulcanisation conditions: 60 minutes at 155° C. These model tyres were subjected to two tests as follows:

Grip on a wet Delugrip road surface (Delugrip is a Registered Trade Mark) was measured using the internal drum machine described in a paper by R.J. Blythe published in "Proceedings of The International Rubber Conference", 1986, Gothenburg, Sweden. Measurements of the wet grip were made for peak and locked wheel sliding friction over a range of speeds from 8.9 to 22.4 m/sec. The test was repeated using a Bridport pebble surface instead of the Delugrip surface. The results obtained were normalised relative to the control. These results (together with mean normalised values for the two surfaces) are shown in Table 2.

The same machine was used using a concrete surface to determine the volume wear rating for the model tyres: the results (normalised against the control as 100) are given in Table 2.

TABLE 2

| | Control | Example No. 1 | 2 | 3 |
|---|---|---|---|---|
| Dynamic Response Apparatus (DRA) at 25° C., 3% deflection and 15 Hz | | | | |
| Complex Modulus MPa | 16,3 | 19.6 | 21.4 | 21.4 |
| Loss Factor | 0.45 | 0.42 | 0.41 | 0.42 |
| Loss Modulus MPa | 6.69 | 7.59 | 8.12 | 8.29 |
| Calculated steering response | 100 | 113 | 119 | 119 |

*Internal drum/

TABLE 2-continued

|  | Control | Example No. 1 | 2 | 3 |
|---|---|---|---|---|
| model tyre |  |  |  |  |
| Wet grip | 100 | 95 | 99 | 96 |
| Bridport pebble |  |  |  |  |
| Delugrip | 100 | 100 | 105 | 103 |
| Mean | 100 | 98 | 102 | 100 |
| Wear concrete | 100 | 98 | 94 | 97 |

*Blythe, Int. Rubber COnference 1986 Gothenburg, Sweden

The rheometry of each of the rubber compositions of Examples 1, 2 and 3 and of comparative Example A is shown in Table 3 below. The meanings and means of calculation of the parameter symbols shown in Table 3 are as follows:

| Parameter | Parameter Descriptions Symbol | Calculation | Units |
|---|---|---|---|
| Plasticity | min | minimum torque | Nm |
| Scorch | S | time to min + 0.2265 Nm (+ 2.0 inch lbs) | minutes |
| Time to 35% x link density | T35 | time to 35% of max-min | minutes |
| Time to 90% x link density | T90 | time to 90% of max-min | minutes |
| Cure rate | CR | $\frac{0.9 (max-min) - 0.2265}{T90 - S}$ | $\frac{Nm}{minutes}$ |
| X link density | Max-min | torque at Max - torque at min | Nm |
| Optimum torque | OT | maximum torque when reversion occurs | Nm |
| Maximum torque | MT | maximum torque when reversion does not occur |  |
| NB MT can be at 60, 90 or 120 minutes depending on the time chosen for the compound to be tested. |  |  |  |
| Reversion rate | RR | $\frac{OT - torque\ 10\ mins\ beyond\ OT}{10}$ | $\frac{Nm}{minutes}$ |
| Reversion index (1) | RI(1) | $\frac{100\ (OT - torque\ at\ 60\ mins)}{OT - min}$ | — |
| Reversion index (16) | RI(16) | $\frac{100\ (OT - torque\ at\ 16\ hours)}{OT - min}$ | — |
| Time to optimum torque | T100 | required for computing T100 + 10 for reversion rate calculation | mins |

TABLE 3

| Parameter Symbol | Example A | 1 | 2 | 3 | Units |
|---|---|---|---|---|---|
| min | 2.43 | 2.96 | 1.98 | 2.86 | Nm |
| S | 7.08 | 5.42 | 5.97 | 5.80 | mins |
| T35 | 9.00 | 8.17 | 8.25 | 8.92 | mins |
| T90 | 19.67 | 21.50 | 19.67 | 23.75 | mins |
| CR | .36 | .27 | .30 | .25 | Nm/min |
| MAX min | 5.57 | 5.35 | 5.06 | 5.57 | Nm |
| OT | 8.00 | 8.31 | 7.05 | 8.42 | Nm |
| MT | — | — | — | — | Nm |
| RR | .003 | — | .005 | — | Nm/min |
| RI(1) | — | .2 | — | — | — |
| RI(16) | — | — | — | — | — |
| T100 | 48.50 | 52.92 | 39.50 | 53.00 | mins |

The plasticity of the rubber compositions of Examples 1, 2 and 3 and of comparative Example A measured at 50° C. is shown in the accompanying drawing in which the four graphs labelled respectively 1, 2, 3 and A relate respectively to those Examples.

We claim:

1. A pneumatic tire, with improved steering response, comprising:
a tread portion comprised of an elastomeric composition, said composition containing as a steering response substance a long chain hydroxy fatty acid with 1 to 6 hydroxy groups or a derivative thereof, or an intercondensed or intra-condensed form thereof whereby frictional grip on wet road surfaces is not reduced as a result of improved steering response, the steering response substance having a melting point in the range of 50 to 130° C.

2. A pneumatic tire according to claim 1, in which the hydroxy fatty acid is a saturated monocarboxylic acid having:
(a) 9 to 25 carbon atoms as well as the carbon atom of the carboxylic acid group; and
(b) 1 to 6 hydroxy groups.

3. A pneumatic tire according to claim 1, in which the hydroxy fatty acid is one having the general formula:

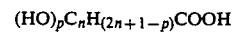

where
n is in the range from 9 to 25
and p is in the range from 1 to 6.

4. A pneumatic tire according to claim 1, in which the hydroxy fatty acid is one having the general formula:

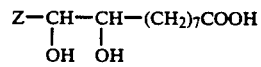

where Z is a hydrocarbyl or hydroxy-substituted hydrocarbyl residue.

5. A pneumatic tire according to claim 3, in which n is in the range from 13 to 17.

6. A pneumatic tire according to claim 3, in which p is 2, 3 or 4.

7. A pneumatic tire according to claim 5, in which n is 15.

8. A pneumatic tire according to claim 5, in which n is 17.

9. A pneumatic tyre according to claim 3, in which the hydroxy fatty acid is a tri- or other polyhydroxy palmitic acid.

10. A pneumatic tyre according to claim 9, in which the hydroxy fatty acid is 9, 10, 16-trihydroxypalmitic acid.

11. A pneumatic tyre according to claim 1, in which the hydroxy fatty acid is 9,10-dihydroxystearic acid.

12. A pneumatic tyre according to claim 1, in which the hydroxy fatty acid is in the form of a lactone or lactide.

13. A pneumatic tyre according to claim 1, in which the steering response substance is a shellac.

14. A pneumatic tyre according to claim 1, in which said derivative is an ester, ether, salt or other derivative which is compatible with its use as a steering response substance.

15. A pneumatic tyre according to claim 5 in which p is 2, 3 or 4.

* * * * *